under 35 U.S.C. 154(b) by 323 days.

(12) United States Patent
Pendergraft et al.

(10) Patent No.: US 10,081,124 B2
(45) Date of Patent: Sep. 25, 2018

(54) MODULAR HEATING AND COOLING ELEMENTS FOR CONTROLLING TEMPERATURE OF MATERIALS IN A FLOWABLE STATE

(71) Applicants: Gordon Pendergraft, Tulsa, OK (US); John Pendergraft, Tulsa, OK (US)

(72) Inventors: Gordon Pendergraft, Tulsa, OK (US); John Pendergraft, Tulsa, OK (US)

( * ) Notice: Subject to any disclaimer, the term of this patent is extended or adjusted under 35 U.S.C. 154(b) by 323 days.

(21) Appl. No.: 14/590,420

(22) Filed: Jan. 6, 2015

(65) Prior Publication Data

US 2016/0193773 A1    Jul. 7, 2016

(51) Int. Cl.
*B29C 47/82* (2006.01)
*B29C 47/00* (2006.01)
*B29C 47/08* (2006.01)

(52) U.S. Cl.
CPC ........ *B29C 47/822* (2013.01); *B29C 47/0009* (2013.01); *B29C 47/0818* (2013.01); *B29C 47/825* (2013.01); *B29C 47/827* (2013.01)

(58) Field of Classification Search
CPC ............ B29C 47/0009; B29C 47/0818; B29C 47/825; B29C 47/822; B29C 47/827
USPC ................................ 219/526; 165/11.1, 48.1
See application file for complete search history.

(56) References Cited

U.S. PATENT DOCUMENTS

| 1,985,830 | A | * | 12/1934 | Hynes | F24H 1/102 |
| | | | | | 392/471 |
| 5,974,227 | A | | 10/1999 | Schave | |
| 6,486,445 | B1 | | 11/2002 | Pendergraft | |
| 6,903,308 | B2 | | 6/2005 | Pendergraft | |
| 7,196,293 | B2 | * | 3/2007 | Britto | H01R 13/7038 |
| | | | | | 219/387 |
| 7,914,277 | B1 | | 3/2011 | Burrows et al. | |
| 2004/0074891 | A1 | * | 4/2004 | Pendergraft | B29C 45/74 |
| | | | | | 219/424 |
| 2007/0056950 | A1 | * | 3/2007 | Yudovsky | F27B 5/04 |
| | | | | | 219/406 |
| 2007/0222125 | A1 | | 9/2007 | Grajewski | |
| 2009/0056856 | A1 | | 3/2009 | Taylor et al. | |

(Continued)

FOREIGN PATENT DOCUMENTS

| JP | 3709988 | 10/2005 |
| JP | 2014034125 | 2/2014 |
| WO | WO2008002022 | 1/2008 |

OTHER PUBLICATIONS

International Search Report and Written Opinion from Corresponding PCT Patent Application PCT/US2015/055851; dated Jan. 25, 2016; Korean Intellectual Property Office.

*Primary Examiner* — Dana Ross
*Assistant Examiner* — Kuangyue Chen
(74) *Attorney, Agent, or Firm* — Head, Johnson, Kachigian & Wilkinson, PC

(57) ABSTRACT

An apparatus for controlling temperature of materials in a flowable state as they flow through a barrel. The apparatus includes a band surrounding the barrel having a plurality of connected blocks, each block having an inner surface in communication with the barrel. One or more of the connected blocks has a slot therein and has a removable, temperature controlling mechanism slidably received in the slot. A flexible cover surrounds an outer surface of the band with the flexible cover having a pouch for receiving a temperature sensing element.

11 Claims, 6 Drawing Sheets

(56) References Cited

U.S. PATENT DOCUMENTS

2011/0005647 A1\* 1/2011 Campfield ............. B65D 65/10
 150/154
2011/0221088 A1 9/2011 Fuse
2012/0193347 A1\* 8/2012 Schwartz ................... F24J 1/00
 219/482

\* cited by examiner

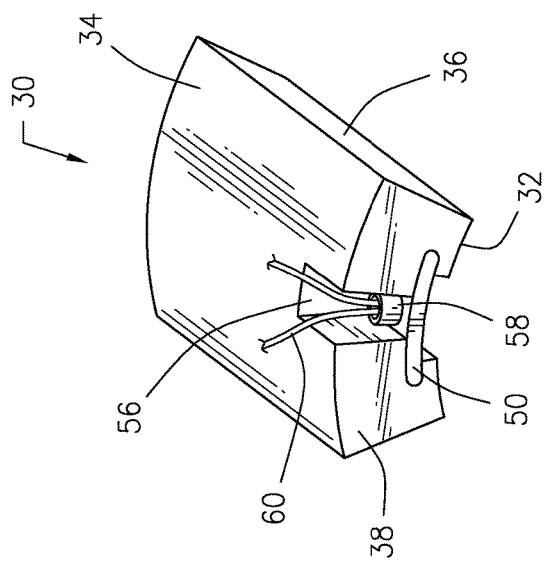
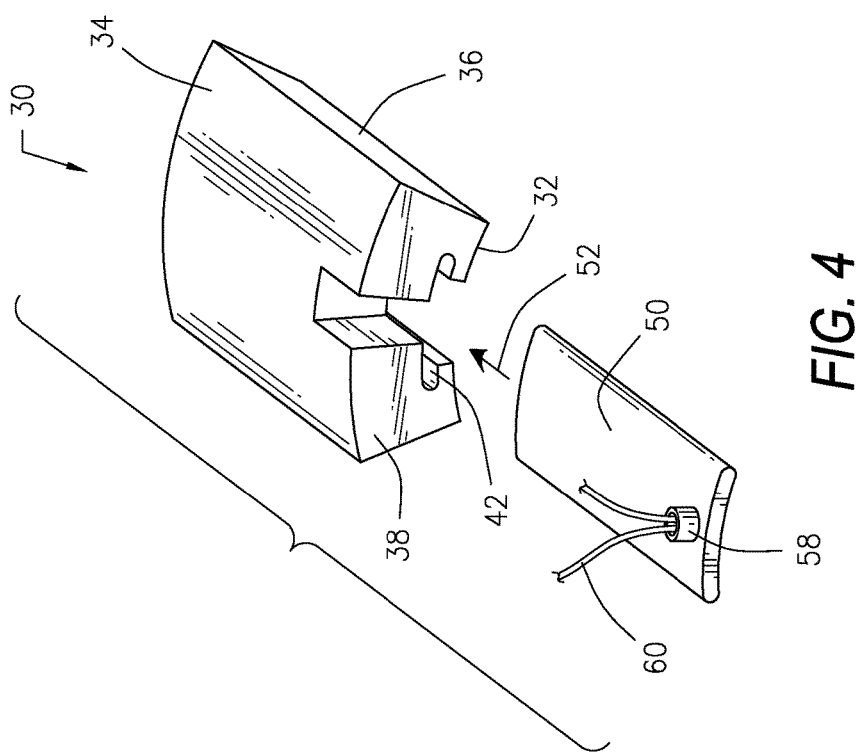

MODULAR HEATING AND COOLING ELEMENTS FOR CONTROLLING TEMPERATURE OF MATERIALS IN A FLOWABLE STATE

BACKGROUND OF THE INVENTION

1. Field of the Invention

The present invention relates to an apparatus for controlling the temperature of materials in a flowable state as they flow through a barrel and for insulating the barrel. In particular, the present invention is directed to modular heating and cooling elements for controlling temperature utilizing removable and replaceable heating or cooling elements.

2. Prior Art

It is known in the plastics and polymer industries to utilize injection and/or extrusion equipment to form or manufacture components and products. Plastic or polymer resins along with additives are subjected to hot temperatures in order to convert the plastic or polymer resins into a flowable material. The material is injected or forced under pressure through a barrel before directing into a mold cavity or die. The barrel may include a rotating screw which mixes the materials and moves them through the barrel. Thereafter, the molten plastic or resin leaves the barrel and enters the mold or die.

In order to insure optimum flow characteristics, the barrels are often equipped with heating or cooling mechanisms in order to control the temperature of the compound. Assignee's prior patent, U.S. Pat. No. 6,486,445, entitled "Vacuum Cast Ceramic Fiber Insulated Band Having Heating and Cooling Elements," illustrates an example of a ceramic fiber insulated band. The flow characteristics of the fluid material are dependent upon the ability to control the heat applied to the barrel as the fluid passes therethrough.

Notwithstanding the foregoing, it would be desirable to provide an apparatus for controlling the temperature of materials in a flowable state as they flow through a barrel wherein individual temperature controlling mechanisms are removable and replaceable.

In addition, it would be desirable to provide an apparatus for controlling the temperature of materials in a flowable state as the materials flow through a barrel wherein a cover or jacket surrounds the band of the apparatus to protect the band from damage or dirt and to provide a receptacle for a temperature sensing element.

SUMMARY OF THE INVENTION

The present invention is directed to an apparatus for controlling the temperatures of materials in a flowable state. The apparatus surrounds and encases a barrel as the materials pass therethrough.

The band entirely surrounds and circumnavigates the barrel in order to provide a heating and/or cooling mechanism. In addition, the band serves to insulate the barrel and protect the barrel.

Each band includes a plurality of adjacent connected blocks. Each block includes an inner surface in communication with an outer surface of the barrel. Each block also includes an outer surface from and opposed to the inner surface. Each block also includes a pair of opposed side surfaces which mate with side surfaces from adjoining blocks.

Each block includes an arcuate slot which is accessible through an opening in a first end of the block. The arcuate slot is also in communication through an opening with the inner surface of the block. A removable temperature controlling mechanism is received in the slot.

A flexible cover may be installed around the band. The cover includes a pair of opposed slats. Hooks or other fasteners project from each of the slats. When the cover is wrapped around the band, the hooks on the slats will be opposed to each other. A strap or straps, such as an O-ring or similar connector, secures the hooks in order to keep the cover in place. A pouch may be provided in the flexible cover to receive a temperature sensing element.

BRIEF DESCRIPTION OF THE DRAWINGS

FIGS. 4 and 5 illustrate an example of a first preferred embodiment of a block of the band of the apparatus illustrating insertion of a removable temperature control mechanism;

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
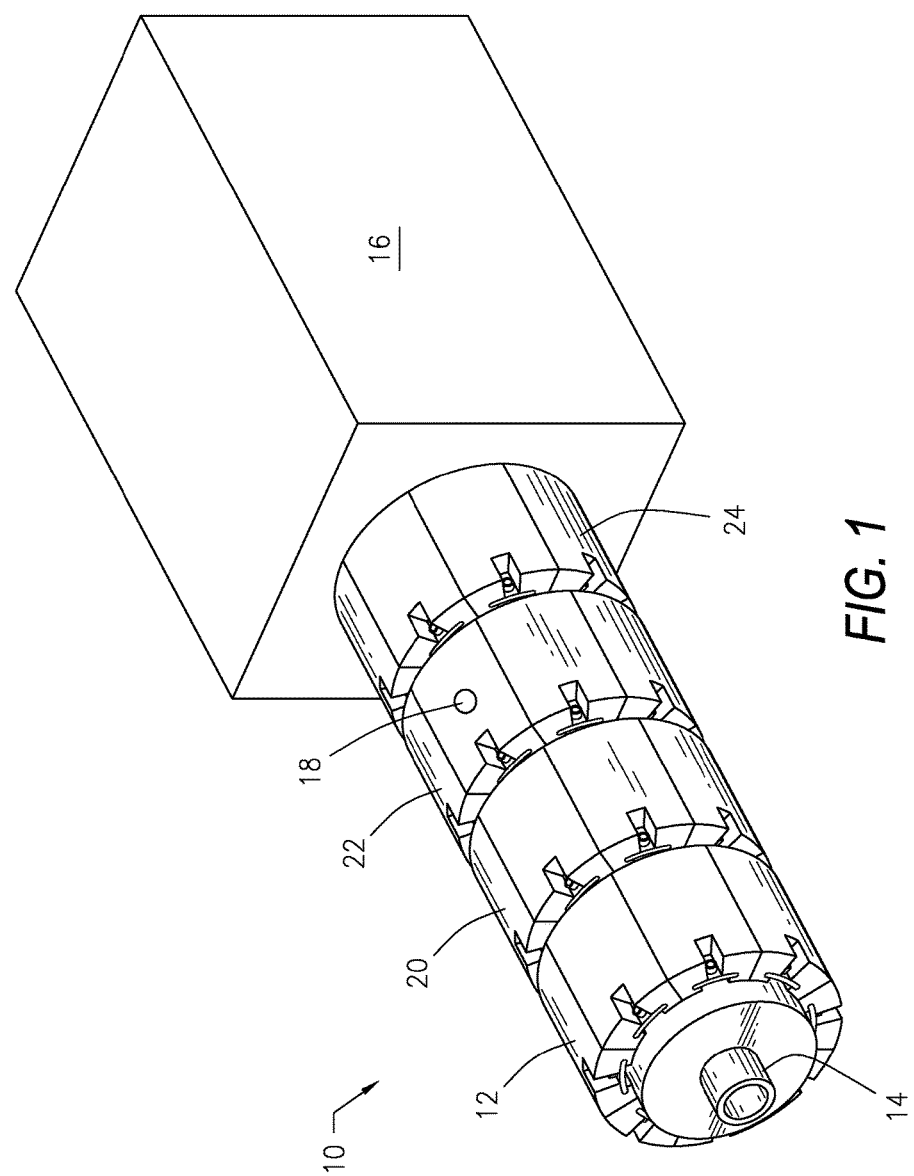
FIG. 1 illustrates a perspective view of an apparatus for controlling the temperature of materials in a flowing state constructed in accordance with the present invention.

Referring to the drawings in detail, FIG. 1 illustrates a perspective view of a first preferred embodiment of an apparatus 10 for controlling the temperature of materials in a flowable state. The apparatus 10 surrounds and encases a barrel 14. The barrel 14 may include a rotating screw (not shown) to move the materials therethrough.

The raw materials which are used for the parts or components to be molded or manufactured are mixed and prepared within a plastic injection and/or extrusion machine 16. In one non-limiting example, plastics beads are fed into the injection and/or extrusion machine 16 along with colorants or other additives.

During the injection or extrusion process, the ability to maintain control over the temperature of the material is critically important. The materials pass from the machine 16 through the barrel 14 and into a mold or die (not shown) at the opposed end of the barrel 14.

In the present embodiment, the barrel 14 is in the form of a cylinder although other embodiments, such as a square or oval cross section are possible within the spirit and scope of the invention.

The band 12 entirely surrounds and circumnavigates the barrel 14. The band 12 completely encases the barrel 14 and, as will be described in detail, provides a heating and/or cooling mechanism. In addition, the band 12 serves to insulate the barrel 14 to retain the heat therein. Finally, the band 12 serves to protect the barrel 14 from damage.

In the preferred embodiment shown in FIG. 1, the apparatus includes four bands, 12, 20, 22 and 24, which are axially aligned with each other and also axially aligned with the barrel 14. Each band may be maintained at the same temperature or alternatively, the bands may be maintained at different temperatures.

Each band includes a plurality of aligned and adjacent connected blocks 30. When installed, the blocks 30 form an annular band around the barrel. The blocks 30 are composed of an insulating material, such as, but not limited to, vacuum cast ceramic fiber material. Each block 30 has an inner surface which mates with and is in communication with the barrel 14.

In the present embodiment, the band 12 includes eight adjoining blocks 30, although a greater or lesser number may be employed within the spirit and scope of the invention.

The individual blocks 30 may be held together by a securing mechanism, such as a cord or fastener.

As an option, one or more of the blocks 30 may include a temperature sensing element 18.

A first preferred configuration of an individual block 30 is shown in FIG. 4 and in FIG. 5, apart from the apparatus 10 as a whole.

Each block 30 includes an inner surface 32 which is in communication with and mates with an outer surface of the barrel 14. Each block 30 also includes an outer surface 34 spaced from and opposed to the inner surface 32. Each block 30 also includes a pair of opposed side surfaces 36 which mate with side surfaces from adjoining blocks 30.

In addition, each block 30 includes a first end 38 and a second opposed end (not visible).

Each block 30 includes an arcuate slot 42 accessible through an opening in the first end 38 of the block 30. The arcuate slot 42 is also in communication with the barrel through an opening with the inner surface 32 of the block 30.

A removable temperature controlling mechanism 50 is slidably received in the slot 42. FIG. 5 shows the temperature control mechanism 50 inserted into the block 30 while FIG. 4 illustrates the temperature controlling mechanism 50 exploded therefrom. Arrow 52 illustrates the direction for slidable insertion of the temperature controlling mechanism 50. The temperature controlling mechanism is removed in the opposite direction.

Each block 30 also includes a notch 56 in the outer surface 34 of the block 30, which notch 56 is in communication with the slot 42. The notch 56 receives a projection 58 from the temperature control mechanism 50, which provides space for the leads 60. The leads are in communication with a power source and a control mechanism (not shown).

The temperature control mechanism 50 may take many configurations. In one configuration, the temperature control mechanism is an electric heating element. In another configuration, the temperature control mechanism is a cooling element. Air or liquid may be passed through the cooling element.

Figure 7:
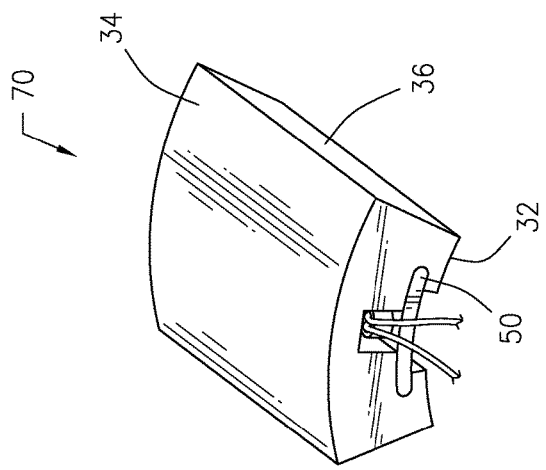
FIGS. 6 and 7 illustrate a second preferred embodiment of a block of the band of the apparatus illustrating insertion of a removable temperature controlling mechanism.
Figure 6:
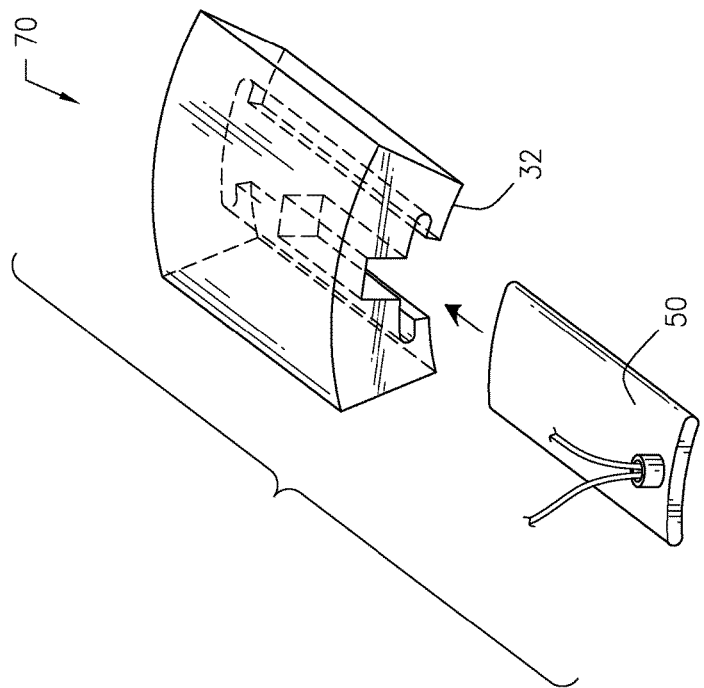

FIGS. 6 and 7 show a second preferred alternate configuration for a block 70. FIG. 7 shows the temperature control mechanism inserted into the block 30 while FIG. 6 illustrates the temperature control mechanism 50 exploded therefrom.

Figure 9:
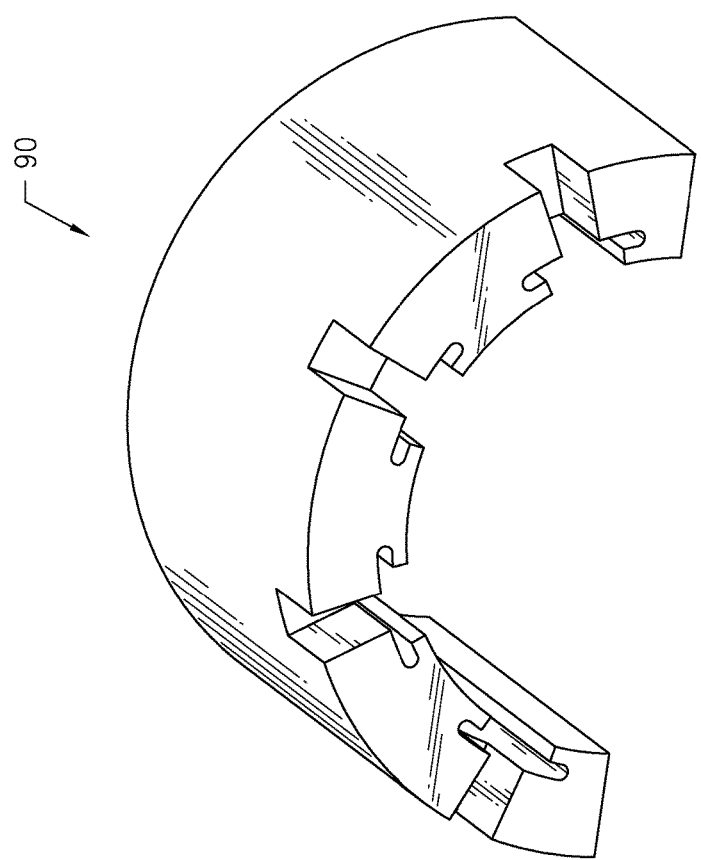
FIG. 9 illustrates a fourth preferred embodiment of a block of the band of the apparatus.
Figure 8:
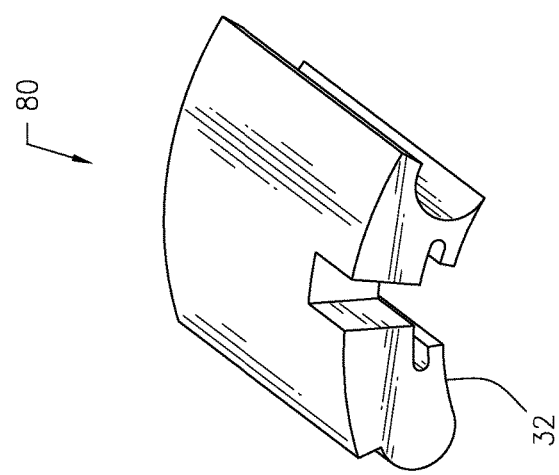
FIG. 8 illustrates a third preferred embodiment of a block of the band of the apparatus.

FIG. 8 shows yet a further, third preferred embodiment of a block 80 having a tongue and groove arrangement. One side of the block 80 has a tongue while the opposed side has a groove. Finally, FIG. 9 shows a fourth preferred arrangement of a block 90 in a hemispherical configuration.

Figure 2:
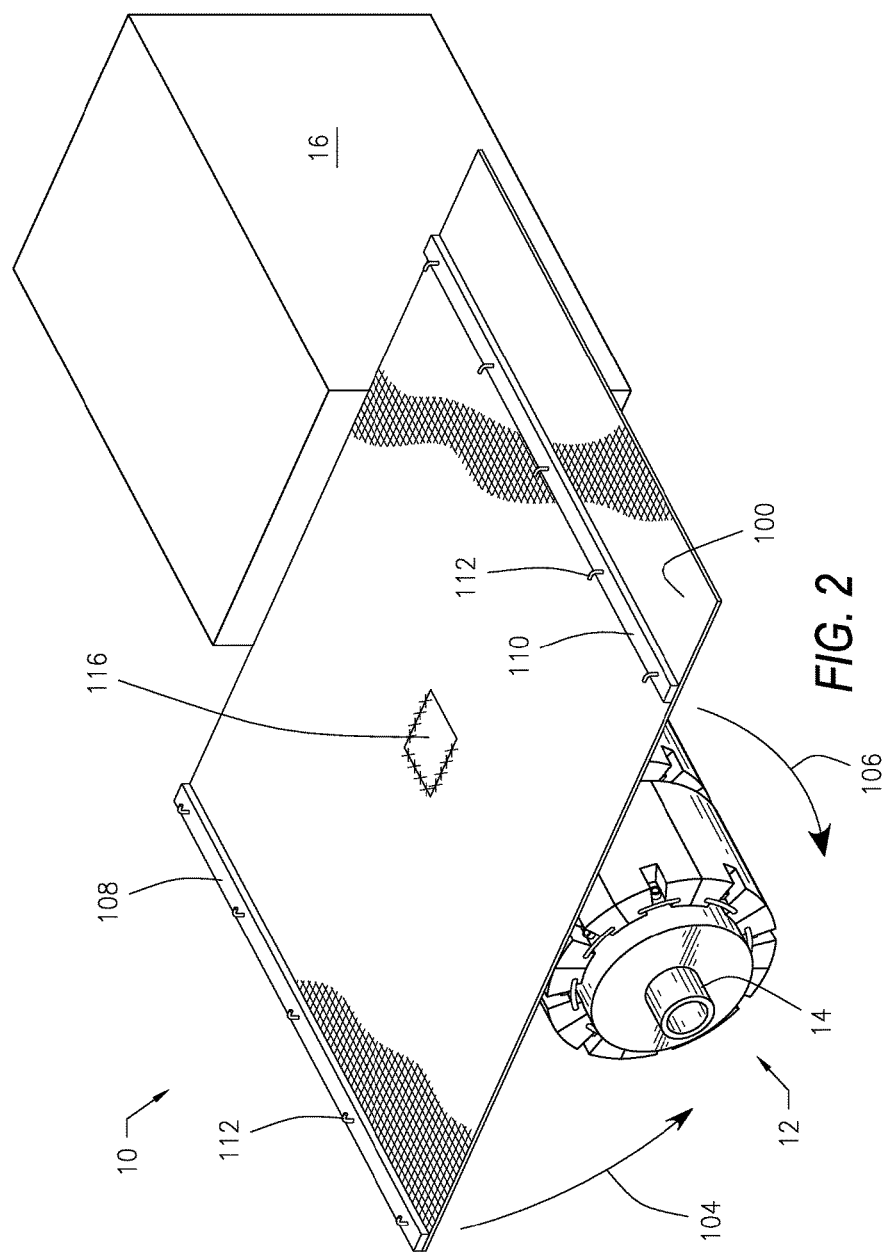
FIG. 2 illustrates a perspective view of the apparatus as set forth in Claim 1 including a flexible cover for surrounding an outer surface of a band of said apparatus shown prior to installation.

FIG. 2 illustrates a perspective view of the apparatus 10 with a flexible cover 100 shown prior to being installed around the bands. The flexible cover 100 may be fabricated from fiberglass or other material. The cover may be composed of a single sheet of material or a pair of sheets with insulation therebetween. The flexible cover 100 has a length which is as long as or, in the present embodiment, longer than the circumference of the band 12. In order to install, the flexible cover 100 will be wrapped around the outer surface of the bands. Arrows 102 and 104 illustrate the direction of installation of the cover 100.

Figure 3:
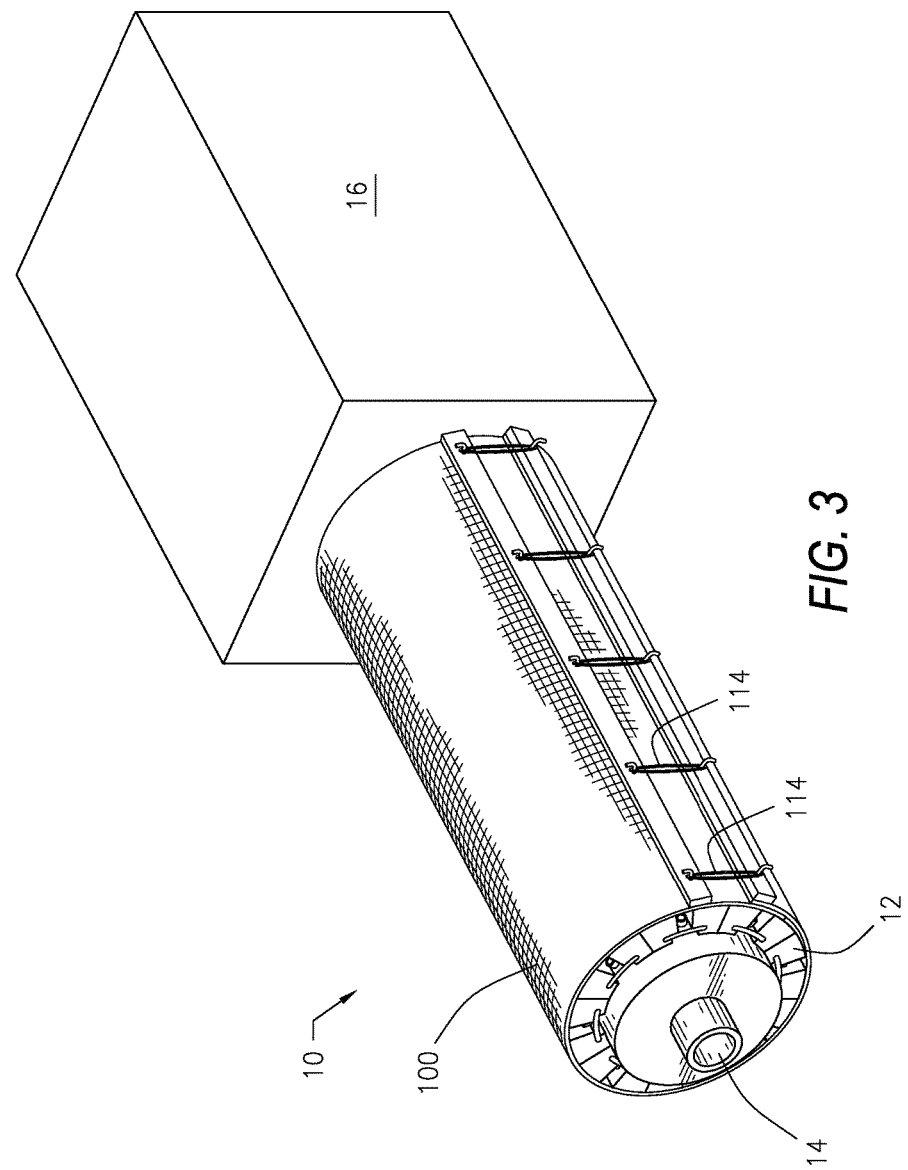
FIG. 3 illustrates the apparatus as set forth in Claim 1 with the flexible cover installed around the band.

FIG. 3 illustrates the flexible cover 100 installed around the bands of the apparatus 10. The cover 100 includes a pair of opposed strips or slats 108 and 110. Hooks or other fasteners project from each of the slats 108 and 110. Accordingly, when the cover 100 is wrapped around the bands, the hooks on the slats 108 and 110 will be opposed to each other. A strap 114, such as an O-ring or similar connector, will be used to secure to the hooks 112 to each other and keep the cover in place.

Returning to a consideration of FIG. 2, a receptacle pouch 116 is provided in or on the cover 100 and may be sewn therein. The pouch 116 may have one open side in order to receive a temperature sensing element (not visible in the pouch). The temperature sensing element may take a number of configurations, including an analog or digital thermometer. The thermometer may have a transmitter therewith to transmit the temperature sensed to a receiver. Alternatively, or in addition thereto, the temperature sensing element may be connected to an alarm to sense a sound or other signal if the temperature exceeds a certain set point. Accordingly, the temperature on the outside of the band may be monitored, which will also provide an indication of the temperature in the barrel.

Whereas, the present invention has been described in relation to the drawings attached hereto, it should be understood that other and further modifications, apart from those shown or suggested herein, may be made within the spirit and scope of this invention.

What is claimed is:

1. An apparatus for controlling temperature of materials in a flowable state as it flows through a barrel and for insulating said barrel, said apparatus comprising:
   a band surrounding said barrel having a plurality of connected blocks, each block having an inner surface in communication with said barrel;
   one or more of said plurality of connected blocks having a slot therein;
   a removable heating element slidably received in said slot; and
   an opening in each said inner surface of each said block, wherein the opening is in communication with said slot such that the opening faces the barrel.

2. An apparatus as set forth in claim 1 wherein each said slot has an arcuate shape.

3. An apparatus as set forth in claim 1 wherein each said removable heating element has an arcuate shape.

4. An apparatus as set forth in claim 1 wherein each said block includes an outer surface opposed to said inner surface and wherein said outer surface includes a notch therethrough in communication with said slot.

5. An apparatus as set forth in claim 1 including a flexible cover surrounding an outer surface of said band, said flexible cover having a receptacle receiving a temperature sensing element.

6. An apparatus as set forth in claim 1 wherein said receptacle is a pouch.

7. An apparatus as set forth in claim 1 including a plurality of bands aligned with each other and axially aligned with said barrel.

8. An apparatus for controlling the temperature of materials in a flowable state as it flows through a barrel and for insulating said barrel, said apparatus comprising:
   a band surrounding said barrel having a plurality of connected blocks;
   one or more of said plurality of connected blocks having a slot therein and including a removable heating element slidably received in said slot and an opening in an inner surface of each said block, where the opening is in communication with said slot such that the opening faces the barrel;
   a flexible cover surrounding an outer surface of said band, said flexible cover having a pouch; and
   a temperature sensing element received in said pouch.

9. An apparatus as set forth in claim 8 wherein said temperature sensing element is a thermometer.

10. An apparatus as set forth in claim 8 wherein said flexible cover is a sheet which is wrapped around said band and secured by fasteners.

11. An apparatus as set forth in claim 10 wherein said fasteners include:
   a plurality of hooks extending from said cover; and
   a plurality of resilient rings.

* * * * *